(12) United States Patent
Takenaka et al.

(10) Patent No.: US 7,905,303 B2
(45) Date of Patent: Mar. 15, 2011

(54) LEGGED LOCOMOTION ROBOT

(75) Inventors: Kenji Takenaka, Tochigi (JP); Takumi Shibata, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/685,360

(22) Filed: Jan. 11, 2010

(65) Prior Publication Data
US 2010/0200312 A1    Aug. 12, 2010

(30) Foreign Application Priority Data

Feb. 10, 2009 (JP) ................................ 2009-029104
Feb. 10, 2009 (JP) ................................ 2009-029105

(51) Int. Cl.
*B62D 51/06* (2006.01)
(52) U.S. Cl. .............................. 180/8.6; 180/8.1; 180/8.5
(58) Field of Classification Search ................... 180/8.1, 180/8.5, 8.6
See application file for complete search history.

(56) References Cited

U.S. PATENT DOCUMENTS

| | | | | |
|---|---|---|---|---|
| 5,255,753 A * | 10/1993 | Nishikawa et al. | ............ | 180/8.6 |
| 6,401,846 B1 * | 6/2002 | Takenaka et al. | ............ | 180/8.6 |
| 6,992,457 B2 * | 1/2006 | Furuta et al. | ............ | 318/568.12 |
| 7,053,577 B2 * | 5/2006 | Nagasaka | ................ | 318/568.12 |
| 7,228,923 B2 * | 6/2007 | Takenaka et al. | ............ | 180/8.6 |
| 7,319,919 B2 * | 1/2008 | Takenaka et al. | ............ | 700/245 |
| 7,525,275 B2 * | 4/2009 | Ohta et al. | ............... | 318/568.12 |
| 7,650,203 B2 * | 1/2010 | Maslov et al. | ................ | 700/245 |
| 7,756,605 B2 * | 7/2010 | Hirose et al. | .................. | 700/245 |
| 7,765,030 B2 * | 7/2010 | Takenaka et al. | ............ | 700/254 |
| 2008/0210477 A1 * | 9/2008 | Takenaka et al. | ............. | 180/8.6 |
| 2009/0301798 A1 * | 12/2009 | Yang et al. | ..................... | 180/8.6 |
| 2009/0308668 A1 * | 12/2009 | Roh et al. | ....................... | 180/8.6 |

FOREIGN PATENT DOCUMENTS

| | | |
|---|---|---|
| JP | 2003-048178 A | 2/2003 |
| JP | 2004-090194 A | 3/2004 |
| JP | 2005-153038 A | 6/2005 |
| JP | 2005-169544 A | 6/2005 |

\* cited by examiner

*Primary Examiner* — Lesley Morris
*Assistant Examiner* — Tashiana Adams
(74) *Attorney, Agent, or Firm* — Arent Fox LLP

(57) ABSTRACT

Disclosed is a legged locomotion robot which is structurally simple and is provided with a tiptoe portion in a foot at a low cost. The legged locomotion robot includes an upper body; two locomotive legs connected to the upper body through a joint; and a locomotive foot connected to a tip end of the leg through a joint; wherein the foot is provided with a foot sole serving as a ground contacting portion of the foot, a curved portion is formed at a predefined distance from a tip end of the foot sole, crossing the foot sole laterally, and the curved portion is configured to be thinner than a tiptoe portion of the foot sole.

3 Claims, 5 Drawing Sheets

LEGGED LOCOMOTION ROBOT

BACKGROUND OF THE INVENTION

1. Field of the Invention

The present invention relates to a legged locomotion robot provided a tiptoe in a foot serving as a tip end portion of a leg connected to an upper body with improved locomotion performance.

2. Description of the Related Art

Hitherto, there has been known a legged locomotion robot provided with a foot as described below.

According to Japanese Patent Laid-open No. 2003-048178, there has been disclosed a foot provided with a joint portion passively and rotatably connected to a tiptoe portion at a position offset from a ground contacting portion of the foot.

According to Japanese Patent Laid-open No. 2004-090194, there has been disclosed a foot provided with a base portion fixed at a corresponding lower end of a leg, a heel portion fixed around a rear end of the base portion and a pair of tiptoe portions extending in parallel from the base portion to the front substantially and swingably supporting the base portion in the vertical direction.

According to Japanese Patent Laid-open No. 2005-153038, there has been disclosed a foot provided with a foot sole having a ground contacting surface disposed at the lowest end of a locomotive leg, a plurality of tiptoe portions rotatably mounted at a front end edge of the foot sole through a joint shaft disposed in a different direction from a pitch axial direction of a body of the legged locomotion robot.

According to Japanese Patent Laid-open No. 2005-169544, there has been disclosed a foot provided with a first foot sole and a second foot sole connected swingably with each other, and an actuator for swinging the two foot soles relatively, wherein the first foot sole is connected to a crus portion of a walking robot, the second foot sole has a ground contacting portion, a swing shaft between the two foot soles is disposed around a front end of the first foot sole and extends in the lateral direction, and the ground contacting portion of the second foot sole extends over the swing shaft in the anteroposterior direction at the ground contacting state.

However, according to the above-mentioned conventional arts, the foot is provided with a rotatable joint for joining the tiptoe portion to the foot, which makes the structure thereof complicated, leading to a problem of high cost.

SUMMARY OF THE INVENTION

An object of the present invention is to provide a legged locomotion robot having a tiptoe portion disposed in a foot with a simple structure and low cost.

The present invention provides a legged locomotion robot comprising: an upper body; a plurality of locomotive legs movably connected to the upper body through a joint; and a locomotive foot movably connected to a tip end of the leg through a joint; wherein the foot is provided with a foot sole serving as a ground contacting portion of the foot, a curved portion is formed at a predefined distance from a tip end of the foot sole, crossing the foot sole laterally, and the curved portion is configured to be thinner than a tiptoe portion of the foot sole.

According to the present invention, the curved portion is formed at a predefined distance from the tip end of the foot sole, crossing the foot sole laterally, and the curved portion is configured to be thinner than the tiptoe portion of the foot sole, therefore, the tiptoe portion can be formed at the foot with a simple structure and low cost.

According to an embodiment of the present invention, the curved portion is composed of a groove having a predefined width in the anteroposterior direction of the foot sole, and the groove protrudes from an upper surface of the foot sole to form a protruded portion having a cross-section shape of an inverted U in the anteroposterior direction.

According to the preferred embodiment, when the tiptoe portion of the foot sole bends at the groove of the curved portion, the foot sole can bend flexibly according to the flexibility of the protruded portion.

According to an embodiment of the present invention, the curved portion is composed of a groove having a predefined width in the anteroposterior direction of the foot sole, and the groove extends from a rear end of the tiptoe portion to a middle portion thereof in the anteroposterior direction of the foot sole.

According to the preferred embodiment, when the tiptoe portion of the foot sole bends at the groove of the curved portion, the foot sole can bend flexibly at an arbitrary position in the groove of an arbitrary portion.

DETAILED DESCRIPTION OF THE PREFERRED EMBODIMENTS

Figure 1:
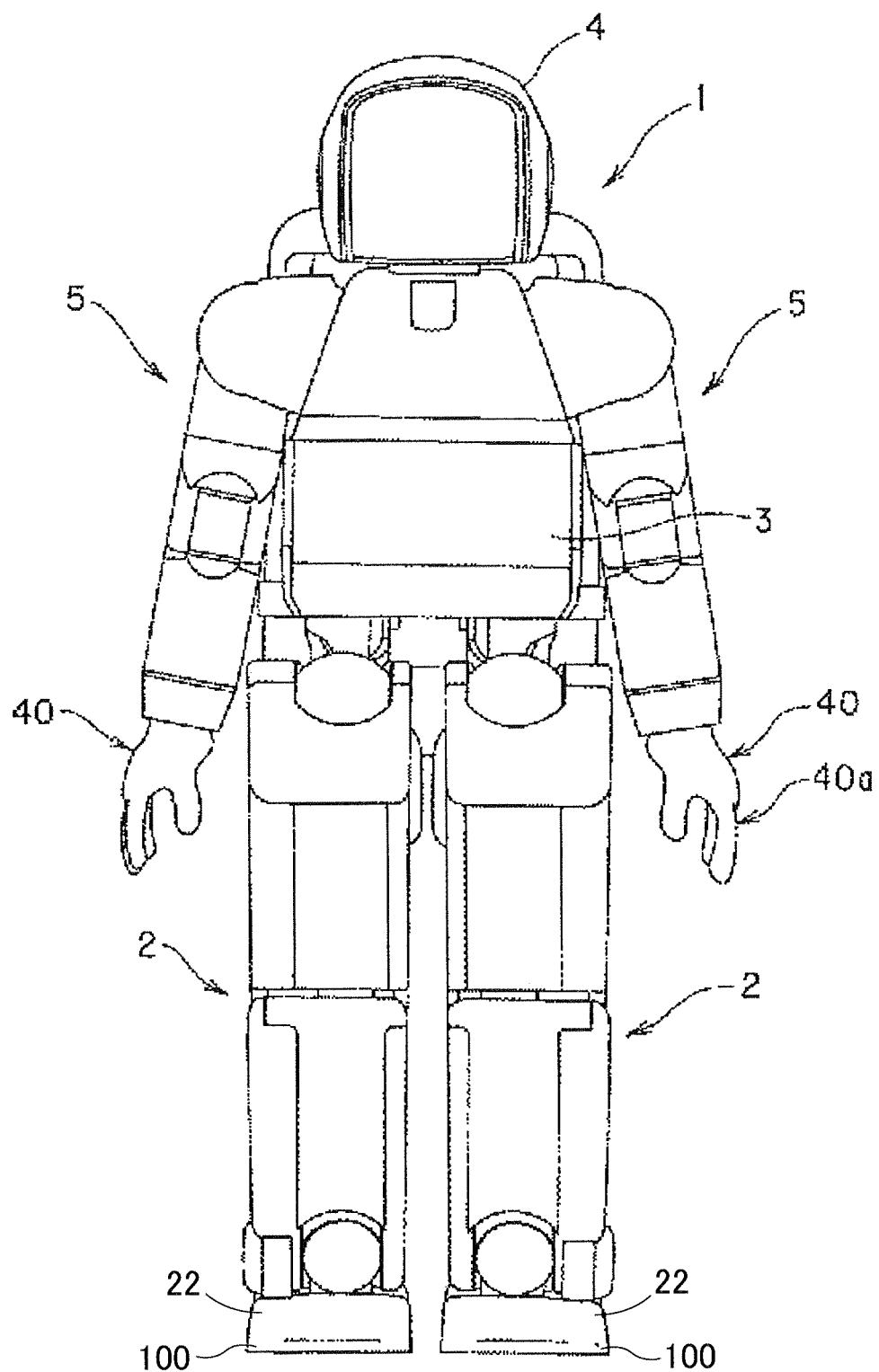
FIG. 1 is a front view of a legged locomotion robot according to an embodiment of the present invention.
Figure 2:
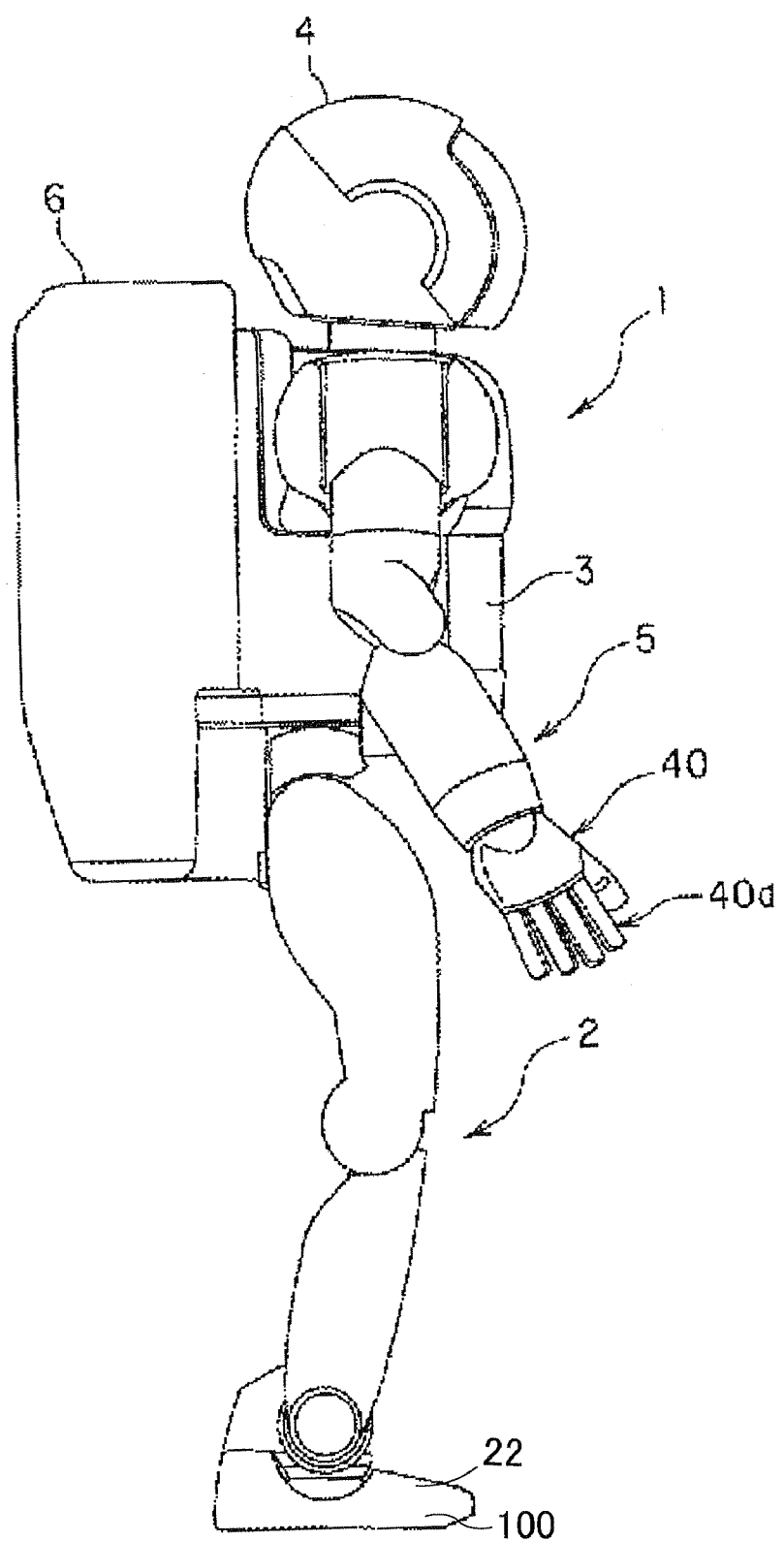
FIG. 2 is a side view of the legged locomotion robot illustrated in FIG. 1.

As illustrated in FIG. 1, a legged locomotion robot (referred to as a robot hereinafter) 1 is provided with a plurality of legs 2 (two legs in the present embodiment) and an upper body 3 disposed above the legs 2. A head 4 is disposed above the upper body 3, and two arms 5 are disposed at both sides of the upper body 3. As illustrated in FIG. 2, the back portion of the upper body 3 is provided with a storing element 6 for housing therein an electronic control unit (to be described later), a battery and the like. The robot 1 illustrated in FIG. 1 and FIG. 2 is covered with a cover to protect the internal structure thereof.

Figure 3:
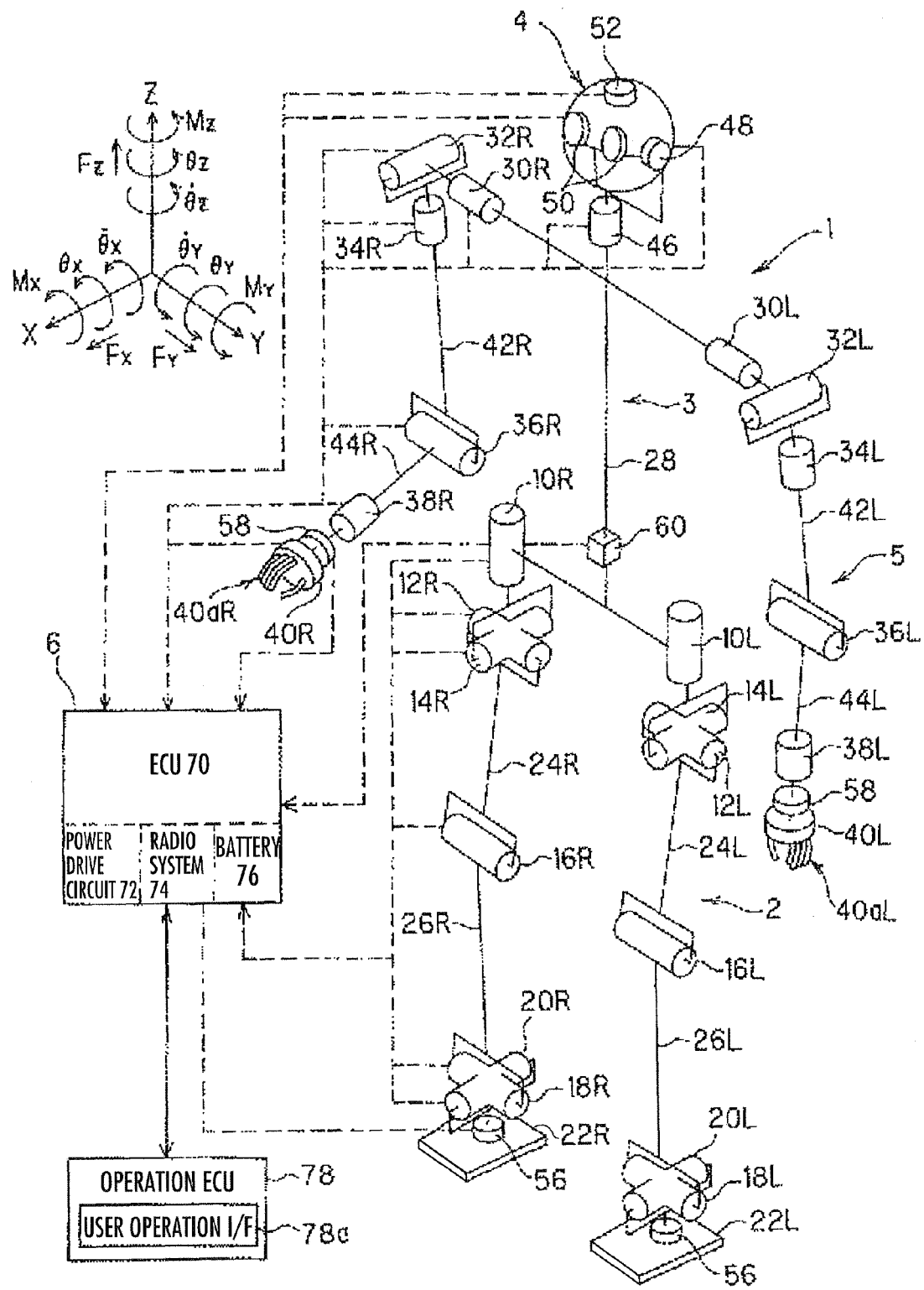
FIG. 3 is a skeleton view of the legged locomotion robot illustrated in FIG. 1 and FIG. 2.

FIG. 3 is an explanatory view of a skeleton of the robot 1. The internal structure of the robot 1 will be described with reference to FIG. 3. As illustrated, the robot 1 is composed of a pair of legs 2 and arms 5 disposed laterally at both sides thereof, and six joints driven by eleven electric motors.

Specifically, the hip joints of the waist (hip) of the robot 1 are disposed with a pair of electric motors 10R and 10L (R denotes the right side and L denotes the left side. Hereinafter, notations of R and L are omitted due to symmetrical reason) for driving the hip joints to rotate the legs 2 around the vertical axis (Z axis), respectively, a pair of electric motors 12 for driving the hip joints to swing (around the Y axis) the legs 2 in the pitch (moving) direction, respectively, and a pair of electric motors 14 for driving the hip joint to rotate the legs in the roll (lateral) direction (around the X axis), respectively. The knee joints of the knees are disposed with a pair of electric motors 16 for driving the knee joints to rotate the lower portions of the legs 2 in the pitch direction (around the Y axis), respectively. The ankle joints of the ankle are disposed with a pair of electric motors 18 for driving the ankle joints to rotate the tip end portions of the legs 2 in the pitch direction (around the Y axis), respectively, and a pair of electric motors 20 for driving the ankle joints to rotate the tip end portions of the legs 2 in the roll direction (round the X axis), respectively.

Note that each joint illustrated in FIG. 3 is denoted by a rotation axis of an electric motor (or a force transmission element connected to the electric motor for transmitting a driving force therefrom, such as a pulley) for driving the joint. A foot 22 is disposed at the tip end of each leg 2.

As above-mentioned, the electric motors 10, 12 and 14 are disposed in the hip joint of the leg 2 with the rotation axes thereof orthogonal to each other, and the electric motors 18 and 20 are disposed in the ankle joint with the rotation axes thereof orthogonal to each other. The hip joint and the knee joint are connected through a thigh link 24. The knee joint and the ankle joint are connected through a crus link 26.

The leg 2 is connected to the upper body 3 through the hip joint. In FIG. 3, the upper body 3 is denoted with an upper body link 28 for brief. As aforementioned, the arms 5 are connected to the upper body 3.

The arm 5 is constituted in the same way as the leg 2. Specifically, the shoulder joints of the shoulder of the robot 1 are disposed with a pair of electric motors 30 for driving the shoulder joints to rotate the arms 5 in the pitch direction, respectively, a pair of electric motors 32 for driving the shoulder joints to rotate the arms 5 in the roll direction, respectively, a pair of electric motors 34 for driving the shoulder joints to rotate the free ends of the arms 5. The elbows are disposed with a pair of electric motors 36 for driving the elbow joint to rotate the lower portions thereof. The tip end portions of the arms 5 are disposed with a pair of electric motors 38 for driving the wrist joint to rotate the tip end portions. A hand (end effecter) 40 is fixed to the tip end of the wrist.

The electric motors 30, 32 and 34 are disposed in the shoulder joint of the arm 5 with the rotation axes thereof orthogonal to each other. The shoulder joint and the elbow joint are connected through an upper arm link 42. The elbow joint and the wrist joint are connected through a lower arm link 44.

Though omitted in the drawings, the hand 40 includes a driving mechanism composed of five fingers 40a. The five fingers 40a can perform operations such as holding an object or the like.

The head 4 is connected to the upper body 3 through an electric motor (constituting the neck joint) 46 around the vertical axis and a head swinging mechanism 48 for swinging the head 4 around an axis orthogonal to the vertical axis. As illustrated in FIG. 3, two CCD cameras 50 for providing the robot 1 to have a free stereo view and an audio input-output device 52 are disposed inside the head 4.

According to the above-mentioned configurations, each leg 2 is provided with six joints, and thus has twelve degrees of freedom. When the six joints are driven at appropriate angles (joint displacement), it is possible to make the leg 2 perform desired motions, which enables the robot 1 to walk in an arbitrary three-dimensional space. Moreover, each arm 5 is provided with five joints, and thus has ten degrees of freedom. When the five joints are driven at appropriate angles (joint displacement), it is possible to make the arm 5 perform desired operations. Furthermore, the head 4 is provided with the neck joint and the head swinging mechanism with two degree of freedom, thus, when they are driven at appropriate angles, the head 4 can be made to face a desired direction.

Each electric motor 10 is disposed with a rotary encoder (not shown) configured to output signals denoting at least one of an angle, an angular velocity and an angular acceleration of a corresponding joint through the rotation of the rotation shaft of the electric motor. In specific, each electric motor 10 is constituted of a DC servo motor.

The foot 22 is disposed with a publicly known 6-axis force sensor (referred to as force sensor hereinafter) 56 configured to output signals denoting three-directional components Fx, Fy and Fz of a ground reaction force and three-directional components Mx, My and Mz of a moment applied to the robot 1 from the ground surface among the external force applied to the robot 1. As publicly known, the force sensor 56 is connected to two flange portions configured to transmit loads, a plurality of distortion detecting elements are fixed at the two flange portions, and the force sensor 56, on the basis of output signals from the distortion detecting elements, calculates each component of force or moment applied to the sensor reference points and outputs the calculated values.

A force sensor (6-axis force sensor) 58 of the same type as the force sensor 56 is disposed between the wrist joint and the hand 40 for outputting signals denoting the external force other than the ground reaction force applied to the robot 1, in detail, three-directional components Fx, Fy and Fz of the external force applied to the hand 40 from an object (reaction force from the object) and three-directional components Mx, My and Mz of a moment.

The upper body 3 is disposed with a declination sensor 60 configured to output signals denoting at least one of a declination (declination angle) of the upper body 3 with relation to the vertical axis and an angular velocity thereof, namely, an amount of declination or the like of the upper body 3 of the robot 1.

The output signals from the force sensor 56 and the like are transmitted to an electric control unit (referred to as ECU hereinafter) 70 housed in the storing element 6. FIG. 3 only illustrates the signal transmission performed at the right side of the robot 1 for convenience. The ECU 70 includes a micro computer composed of a CPU, a memory, an input interface, an output interface and the like. The ECU 70 calculates joint transition values for each joint and issues commands to control the motor 10 or the like constituting each joint so as to enable the robot moving in a stable posture. The storing element 6 houses a driving circuit 72 of the electric motor 10 or the like as a circuit unit, a radio system 74 and a battery 76.

The ECU 70 is connected through the radio system 74 with an operation ECU 78 composed of a micro computer. Intercommunication is enabled between the ECU 70 and the operation ECU 78. The operation ECU 78 includes a user operation I/F 78a. Commands such as emergency stop and the like input by a user (operator) through the user operation I/F 78a is transmitted to the ECU 70 through the radio system 74.

According to the above-mentioned configuration, the ECU 70, on the basis of gait parameters stored in a memory thereof, generates a gait for the walk (motion) of the robot 1, determines displacement amount (driving amount) for each joint on the basis of the generated gait, and drives the corresponding electric motor through the driving circuit 72 to work as the determined displacement amount. When operation commands are input through the operation ECU 78, the ECU 70 performs operation such as stop or the like correspondingly.

According to the present invention, the foot 22 of the robot 1 is configured as described below.

Figure 4:
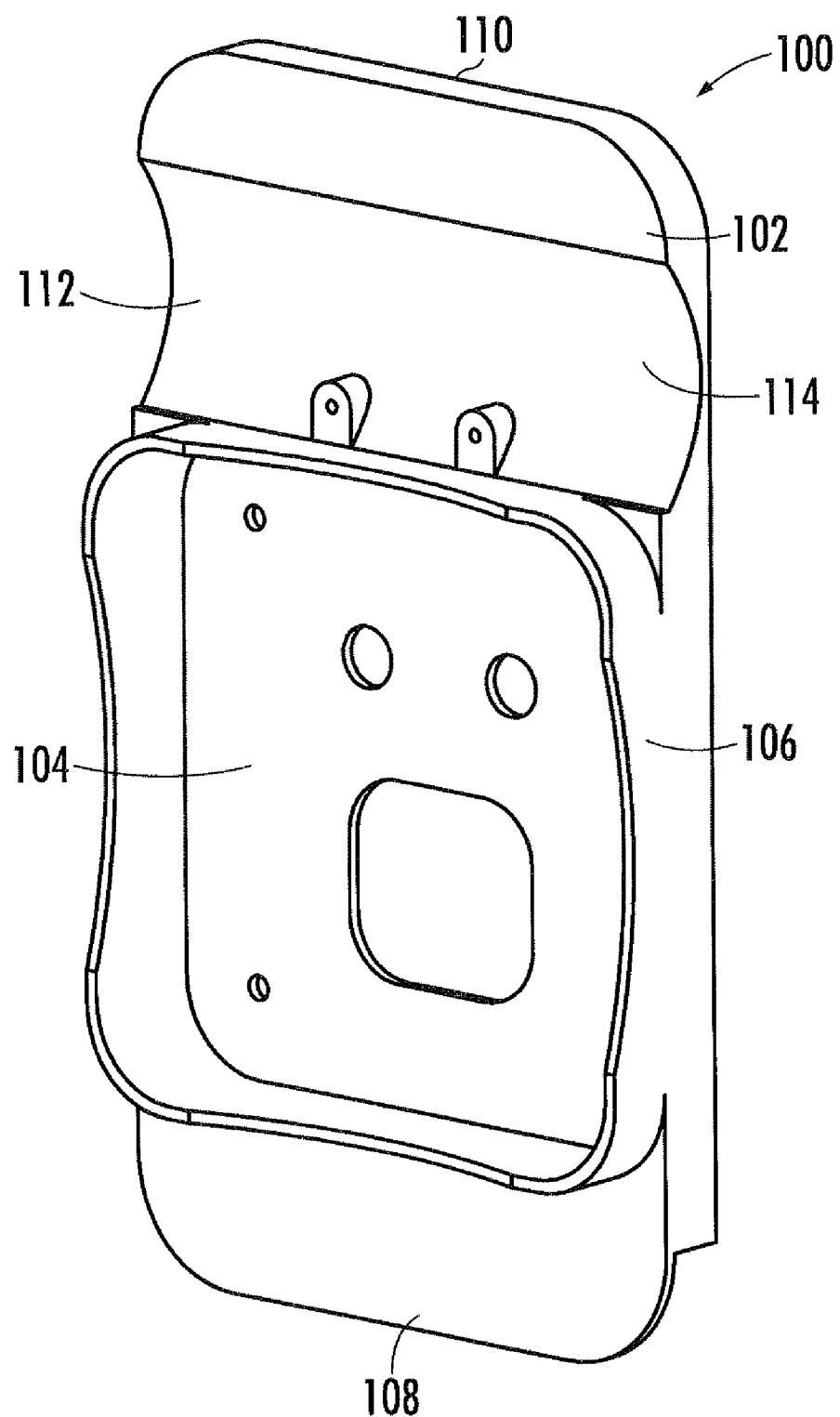
FIG. 4 is a perspective view of a foot sole according to an embodiment of the present invention.
Figure 5:
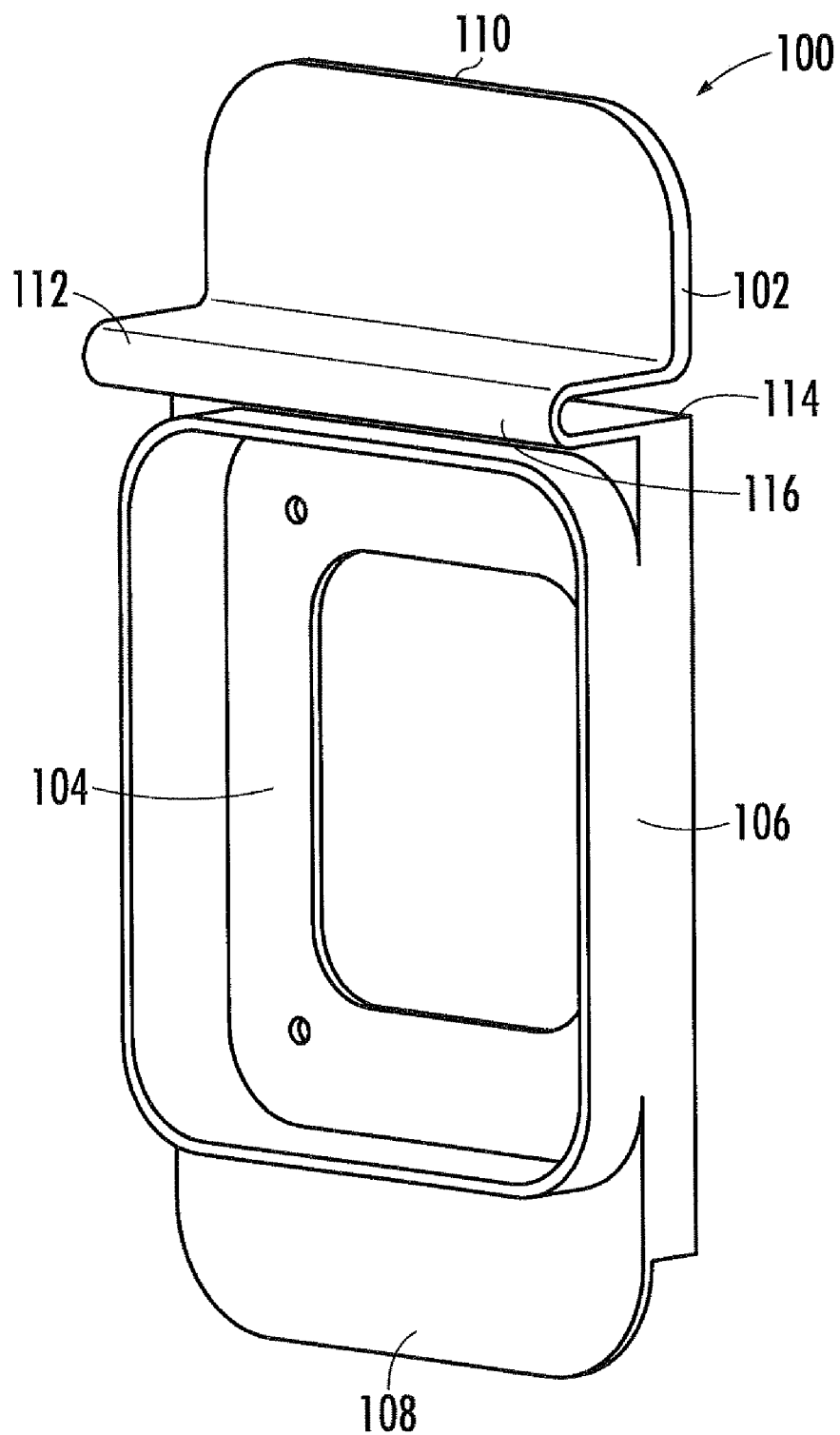
FIG. 5 is a perspective view of a foot sole according to another embodiment of the present invention.

As illustrated in FIG. 4 and FIG. 5, the foot sole 100 includes an open box 106 formed by uprising from a bottom surface 104 in the central portion of a rectangular shape. The lower end portion of the foot 22 is inserted into the open box 106 and fixed there.

The open box 106 is disposed with a tiptoe portion 102 extending for a predefined length to the front and a heel portion 108 extending for a predefined length to the back.

As illustrated in FIG. 4, a curved portion 112 is formed at a predefined distance from a tip end 110 of the foot sole 100, crossing the foot sole laterally, and the curved portion 112 is configured to be thinner than the tiptoe portion 102.

The curved portion 112 is composed of a groove 114 having a predefined width in the anteroposterior direction of the foot sole 100. The groove 114 protrudes from an upper surface of the foot sole 110 to form a protruded portion 116 having a cross-section shape of an inverted U in the anteroposterior direction.

According to the present invention, the tiptoe portion 102 is provided in the foot 22 without using a joint; it is possible to from the tiptoe portion 102 in the foot 22 with a simple structure and at a low cost.

When the tiptoe portion 102 of the foot sole 100 bends at the groove 114 of the curved portion 112, the foot sole 100 can bend flexibly according to the flexibility of the protruded portion 116.

In other words, the protruded portion 116 can flexibly bend, starting at the thinnest location of the groove 114 to the entire part thereof, which ensures a ground contacting area easily.

As illustrated in FIG. 5, a curved portion 112 is formed at a predefined distance from a tip end 110 of the foot sole 100, crossing the foot sole 100 laterally, and the curved portion 112 is configured to be thinner than the tiptoe portion 102.

The curved portion 112 is composed of a groove 114 having a predefined width in the anteroposterior direction of the foot sole 100, and the groove 114 extends from a rear end of the tiptoe portion 102 to a middle portion thereof in the anteroposterior direction of the foot sole 100.

According to the present invention, the tiptoe portion 102 is provided in the foot 22 without using a joint; it is possible to form the tiptoe portion 102 in the foot 22 with a simple structure and at a low cost.

When the tiptoe portion 102 of the foot sole 100 bends at the groove 114 of the curved portion 112, the foot sole 100 can bend flexibly at an arbitrary portion among the groove 114 of the curved portion 112.

In other words, the arbitrary portion 116 can flexibly bend, starting at the thinnest location of the groove 114 to the entire part thereof, which ensures a ground contacting area easily.

Specifically, providing the tiptoe portion 102 in the foot 22 could obtain the following effects.

First, the foot 22 is soft, thus, the center of gravity of the robot 1 can be transferred smoothly, which improves the stability thereof.

Secondly, the ground contacting are can be ensured easily, it is able to make small the swinging joint angle of the ankle joint where the foot sole 100 is attached while walking.

Thirdly, the robot 1 can walk steadily with a small swinging joint angle. If the swinging joint angle is increased, the robot 1 can walk in a greater footstep and has a faster walk speed. By increasing the swinging joint angle, it is possible for to robot 1 to walk up and down the stairs with bigger steps.

Subsequently, the heel of the leg contacting the ground (support leg) can be raised before the heel of the leg which is not contacting the ground (free leg) is landed on the ground. The robot 1 can be configured to walk with the tiptoe contacting the ground for longer time, and consequently, the robot 1 can be made to walk naturally as a human being.

Last, since the free leg can be kicked out, it is possible to generate an assist force for the swinging motion.

Although the present invention has been explained in relation to the preferred embodiments and drawings but not limited, it should be noted that other possible modifications and variations made without departing from the gist and scope of the invention will be comprised in the present invention. Therefore, the appended claims encompass all such changes and modifications as falling within the gist and scope of the present invention.

What is claimed is:

1. A legged locomotion robot comprising:
   an upper body;
   a plurality of locomotive legs movably connected to the upper body through a joint; and
   a locomotive foot movably connected to a tip end of the leg through a joint;
   wherein the foot is provided with a foot sole serving as a ground contacting portion of the foot,
   a curved portion is formed at a predefined distance from a tip end of the foot sole, crossing the foot sole laterally, and
   the curved portion is configured to be thinner than a tiptoe portion of the foot sole.

2. The legged locomotion robot according to claim 1, wherein
   the curved portion is composed of a groove having a predefined width in the anteroposterior direction of the foot sole, and
   the groove protrudes from an upper surface of the foot sole to form a protruded portion having a cross-section shape of an inverted U in the anteroposterior direction.

3. The legged locomotion robot according to claim 1, wherein
   the curved portion is composed of a groove having a predefined width in the anteroposterior direction of the foot sole, and
   the groove extends from a rear end of the tiptoe portion to a middle portion thereof in the anteroposterior direction of the foot sole.

* * * * *